United States Patent
Yang et al.

(10) Patent No.: US 9,364,933 B2
(45) Date of Patent: Jun. 14, 2016

(54) JIG FOR WINSTON CONE BAFFLE MACHINING

(75) Inventors: Sun Choel Yang, Daejeon (KR); Ki Soo Chang, Daejeon (KR); Geon Hee Kim, Sejong (KR); Myeong Sang Kim, Daejeon (KR); Sang Yong Lee, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 631 days.

(21) Appl. No.: 13/993,615

(22) PCT Filed: Nov. 14, 2011

(86) PCT No.: PCT/KR2011/008650
§ 371 (c)(1),
(2), (4) Date: Jun. 12, 2013

(87) PCT Pub. No.: WO2012/091285
PCT Pub. Date: Jul. 5, 2012

(65) Prior Publication Data
US 2013/0255461 A1    Oct. 3, 2013

(30) Foreign Application Priority Data

Dec. 28, 2010    (KR) .......................... 10-2010-0136340

(51) Int. Cl.
*B23Q 3/06* (2006.01)
*B23B 31/02* (2006.01)
*B26D 7/01* (2006.01)

(52) U.S. Cl.
CPC .............. *B23Q 3/065* (2013.01); *B23B 31/021* (2013.01); *B23Q 3/062* (2013.01); *B26D 7/01* (2013.01); *B23B 2215/64* (2013.01); *B23B 2240/21* (2013.01); *Y10T 83/7487* (2015.04)

(58) Field of Classification Search
CPC .......... B23Q 3/103; B23P 19/04; B25B 11/02; B23K 37/0443
See application file for complete search history.

(56) References Cited

U.S. PATENT DOCUMENTS

| 4,934,680 A | 6/1990 | Schneider |
| 5,557,848 A * | 9/1996 | Povey ................... B05B 3/1014 29/465 |

(Continued)

FOREIGN PATENT DOCUMENTS

| JP | 63-035542 U | 3/1988 |
| JP | 07-001209 A | 1/1995 |

(Continued)

*Primary Examiner* — Lee D Wilson
(74) *Attorney, Agent, or Firm* — KORUS Patent, LLC; Seong Il Jeong (57) ABSTRACT

The present invention relates to a jig for processing the inner surface of an aluminum alloy Winston cone baffle having the thickness of a sheet through an ultra-precision machining, the jig having a shape identically corresponding to the outer shape of a Winston cone baffle having a can body shape made up of compound parabolic, and divided into an upper plate jig and a lower plate jig in formation, wherein the upper plate jig is divided in two, a left side jig and a right side jig, which are formed to correspond in shape and size so as to enable isolation or coupling to/from each other, and the inner surface of the Winston cone baffle attached inside the upper plate jig is made to enable ultra-precision machining at the cutting speed of 220 m/min-300 m/min, which enables the inner surface of the Winston cone baffle to process a slickenside having approximately 4 nm of surface roughness, and in particular, ultra-precision machining at surface roughness of Ra=2.32 nm in a processing condition of cutting speed at 260 m/min, cutting depth at 4 micrometer, and feeding speed at 1 mm/min, thereby enabling formation of a Winston cone baffle through low-cost ultra-precision machining.

4 Claims, 7 Drawing Sheets

(56) References Cited

U.S. PATENT DOCUMENTS

| | | | | |
|---|---|---|---|---|
| 6,105,951 A | * | 8/2000 | Shibata | B23Q 3/067 269/100 |
| 2009/0129437 A1 | * | 5/2009 | Chuang | G01J 5/02 374/158 |
| 2013/0340879 A1 | * | 12/2013 | Oh | B21D 5/086 138/140 |
| 2014/0200520 A1 | * | 7/2014 | Holtwick | A61M 5/19 604/240 |

FOREIGN PATENT DOCUMENTS

| JP | 08-267289 A | 10/1996 |
|---|---|---|
| KR | 1996-0011987 B | 9/1996 |

\* cited by examiner

JIG FOR WINSTON CONE BAFFLE MACHINING

BACKGROUND OF THE INVENTION

The present invention disclosed herein relates to a jig for performing cutting process on the inner surface of a cylindrical reflector made of an aluminum alloy and having a thickness of a thin plate by a high-precision cutting process, the jig comprising an upper jig and a lower jig having a shape corresponding to the exterior of the cylindrical reflector which is a Winston cone formed with parabolic curves.

Generally, since infrared cameras used in the field of aerospace technology is a high resolution optical system that can be used for a military camera as well as general observation for ecosystem changes or environmental contaminations, the infrared cameras belong to an advanced technology and the sharing of the technology has been avoided. Accordingly, for autonomous acquisition and management of an infrared image, the self-development of a high resolution infrared camera is essential, and the optical design, manufacturing, and evaluation technologies are necessarily needed.

Since Space Observation Camera (SOC) of the Multi-purpose Infra Red Imaging System (MIRIS) that is being recently studied observes the deep space of 3K continuously through the attitude control of a satellite on a Sun-synchronous orbit, the telescope and the Dewar are cooled to about 200K or less by radiation cooling. In order to effectively help this natural cooling, the SOC of the MIRIS is equipped with a heat insulating plate, a cylindrical reflector with parabolic cross-section (Winston cone baffle), a shielding plate, a 30-layered Multi Layer Insulation (MLI), and a Glass Fiber Reinforced Plastic (GFRP) pipe support.

The present invention is to provide an aerospace infrared camera reflector having a cylindrical shape in which the upper part of the infrared image system has a diameter smaller than that of the lower part, is extended to form a parabolic aspherical surface, and is made of an aluminum alloy of a thin plate structure, by seeking for the optimal conditions for high-precision cutting process and manufacturing the parabolic aspherical reflector (Winston cone) with the cutting process.

SUMMARY OF THE INVENTION

The present invention provides a jig for performing cutting process on the inner surface of a Winston cone reflector made of an aluminum alloy and having a thickness of a thin plate by a high-precision cutting process, which comprises an upper jig and a lower jig having a shape corresponding to the exterior of the Winston cone reflector having a shape of cylinder with parabolic cross-section.

An embodiment of the present invention provides a cutting jig for a Winston cone reflector, the cutting jig including: an upper jig including a left jig and a right jig that are detachably coupled to each other by bolts and nuts, and are symmetrical in shape and size; and a lower jig disposed under the upper jig, wherein the cutting jig receives and fixes the Winston cone reflector in a device for cutting an inner surface of the Winston cone reflector having a thickness of a thin plate and made of an aluminum alloy.

In another embodiment, the lower jig has a circular plate structure on which the upper jig is seated and a plurality of bolt holes formed at a region near the outer diameter of the lower jig at a predetermined interval for coupling the lower jig to the upper jig, and includes: a circular protrusion plate with an outer diameter contacting an inner diameter of the upper jig, which protrudes at an central part of the lower jig; and a plurality of positioning pins disposed at a region near the outer diameter of the circular protrusion plate at a predetermined interval to determine a location of the Winston cone reflector mounted on the circular protrusion plate for a cutting process.

In yet another embodiment, the left jig and the right jig of the upper jig may be coupled to each other by a plurality of bolts. With the left jig and the right jig coupled to each other, the upper jig is coupled to the lower jig by bolts. Four bolts may be disposed on an upper part of the upper jig at a predetermined uniform interval and two bolts may be disposed on a lower part of the upper jig at a smaller interval to prevent the bolts from being unfastened during the cutting process and a high speed rotation of the jig by a machine tool. The bolts for coupling the upper jig and the lower jig may be made of a stainless steel to withstand a maximum tension of 100 N.

In yet another embodiment, the left jig and the right jig have the plurality of through holes formed in an upper circumference thereof at a predetermined uniform interval and the plurality of through holes vertically formed on a central portion thereof at a predetermined uniform interval to control a balance weight of the cutting jig, respectively.

In yet another embodiment, the upper jig may have an adhesive filling groove to reduce a weight of the jig while supporting the Winston cone reflector that is mounted for processing of an inner surface thereof. The adhesive filling groove may be vertically disposed in plurality from the upper part to the lower part of both left and right jigs in two rows at a predetermined interval. The adhesive filling groove may be filled with an adhesive to fix a middle part of a cylindrical body of the Winston cone reflector to the jig, thus allowing the cylindrical body and the jig to be integrally rotated without delivering a rotational vibration of the machine tool to the cylindrical body and without deforming the cylindrical body by a cutting force.

DETAILED DESCRIPTION OF PREFERRED EMBODIMENTS

Some embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The present invention relates to a technology of forming the inner surface of a Winston cone reflector constituting a space observation camera optical system mounted in a satellite.

Figure 1:
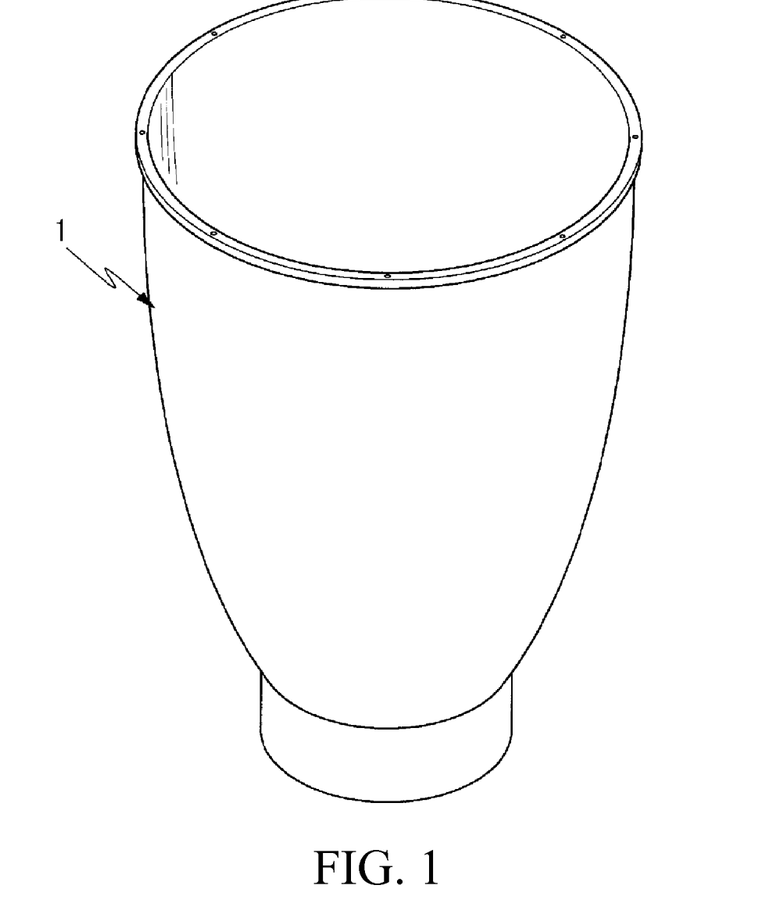
FIG. 1 is a view illustrating a Winston cone reflector.

A Winston cone reflector 1 may have a thickness of a thin plate, and may be made of an aluminum alloy material such as A16061-T651. As shown in FIG. 1, the upper part of the Winston cone reflector 1 may have a diameter larger than that of the lower part, and may extend in a parabolic shape to form a conical cylindrical structure. The inner surface of the cylindrical body is formed as a mirror-like surface.

The Winston cone reflector 1 is firstly rough-cut to form a conical cylindrical body having a parabolic cross-section, and then the inner surface of the cylindrical body may be processed by high-precision cutting to achieve the mirror-like surface. The cylindrical body needs to have a thickness of about 2 mm or less for the purpose of being mounted in a satellite. In this case, since the thickness is too thin, the vibration of a machine tool may be delivered to the cylindrical body, a cutting subject, due to the cutting process such as a typical boring process, and the cylindrical body, the cutting subject may be deformed by a cutting force of a tool, making the processing of the mirror-like surface impossible. Accordingly, in consideration of this limitation, the present invention provides a jig that enables the high-precision cutting process on the inner surface of the Winston cone reflector by fixing the outer surface thereof.

Figure 2:
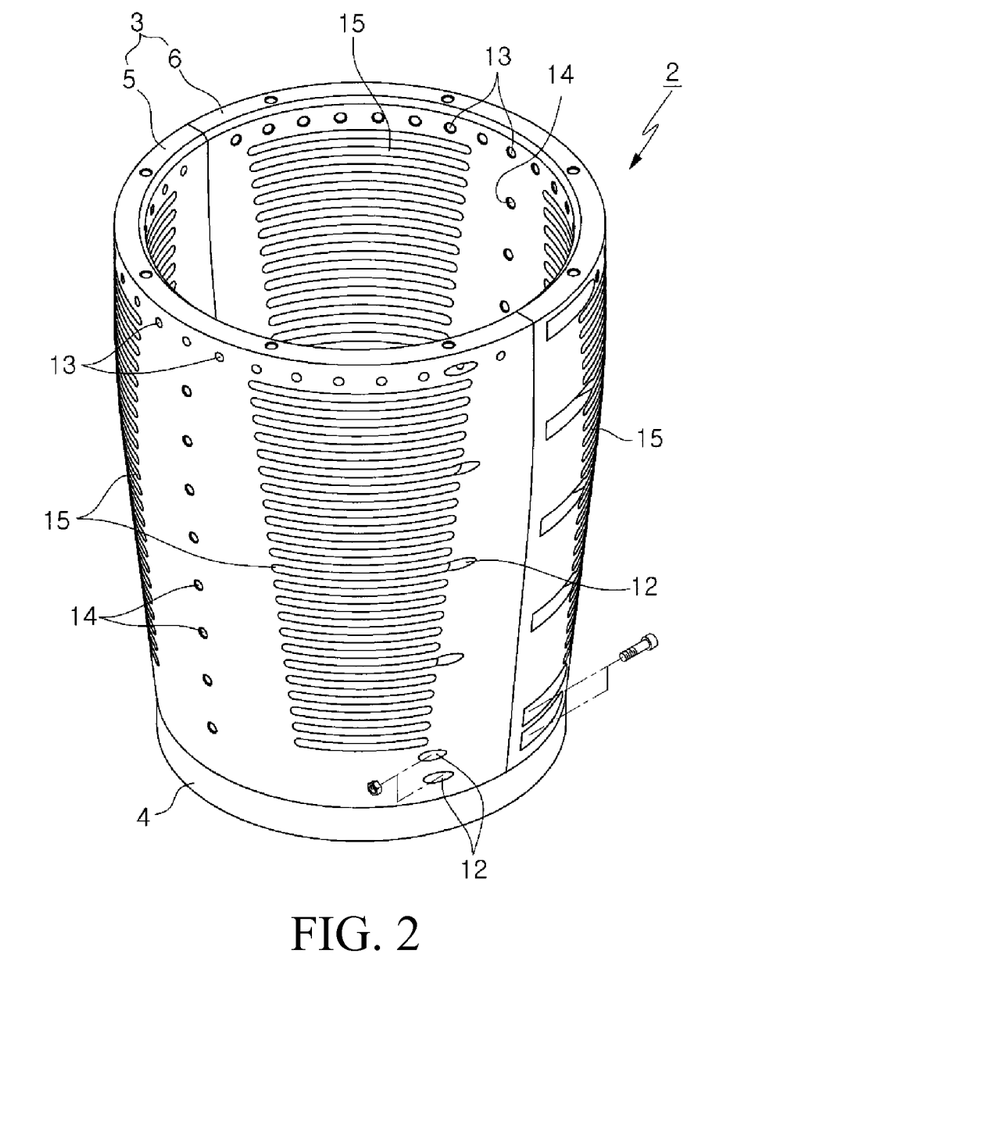
FIG. 2 is a view illustrating a cutting jig for a Winston cone reflector.
Figure 3:
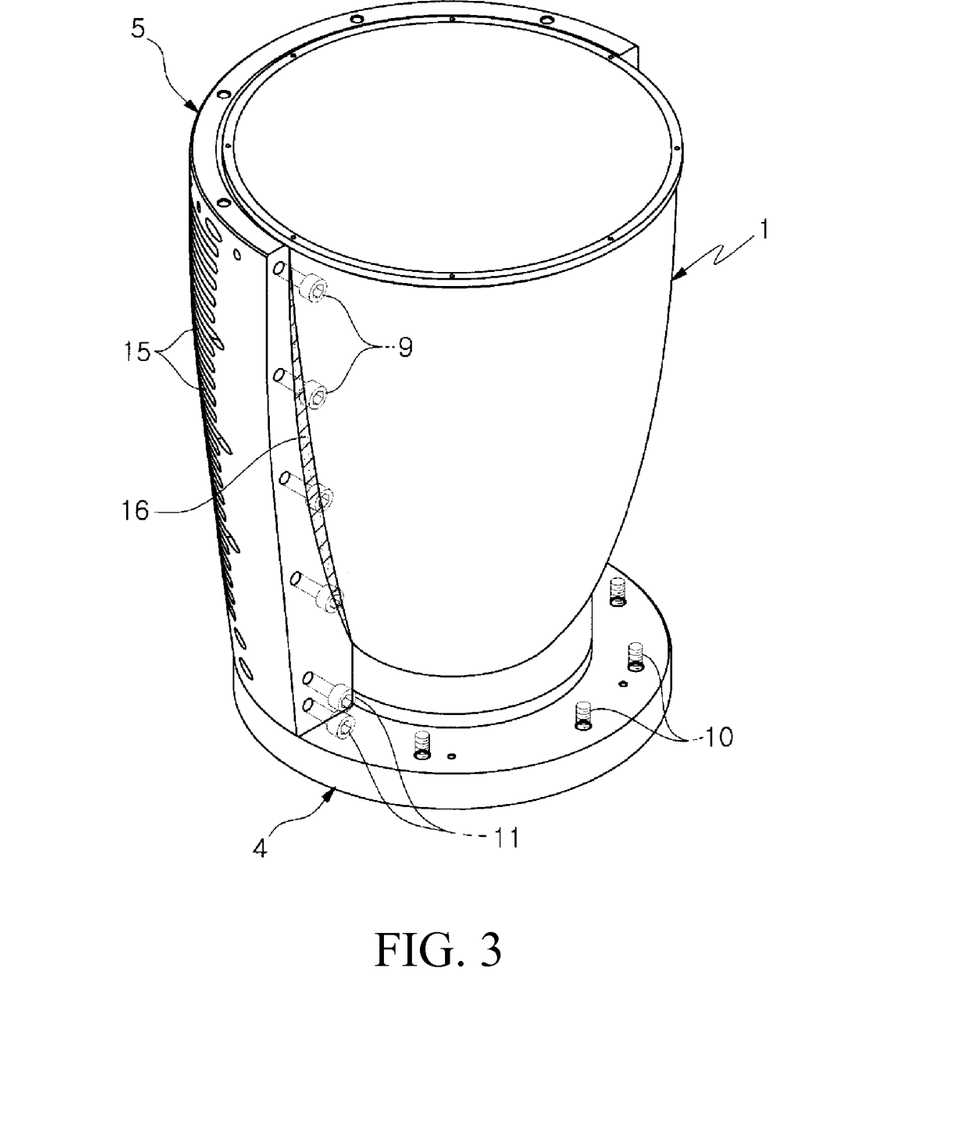
FIG. 3 is a view illustrating a left jig of a cutting jig for a Winston cone reflector.
Figure 4:
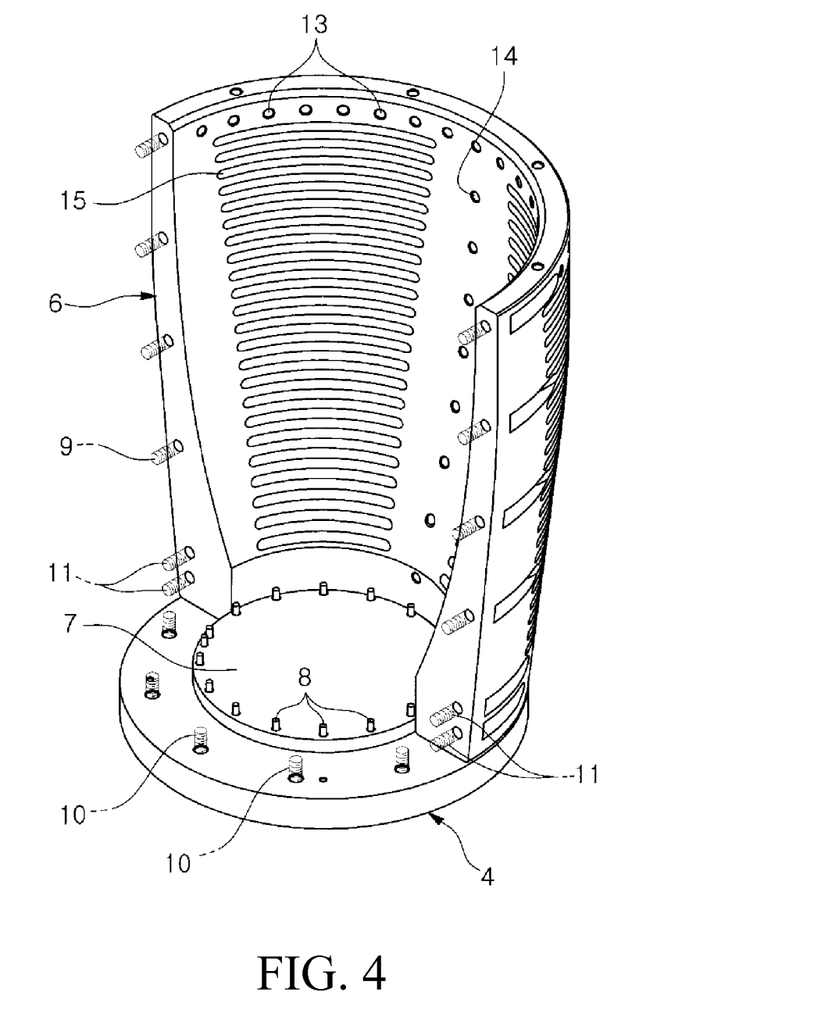
FIG. 4 is a view illustrating a right jig of a cutting jig for a Winston cone reflector.

In order to achieve this purpose, as shown in FIGS. 2 to 4, a cutting jig 2 for a Winston cone reflector may be formed to have a shape and size corresponding to the shape of the Winston cone reflector 1. In this case, the cutting jig 2 is divided into an upper jig 3 and a lower jig 4. The upper jig 3 is divided into a left jig 5 and a right jig 6. The left jig 5 and the right jig 6 are detachably coupled to each other by bolts and nuts, and are symmetrical in their shape and size.

As shown in FIG. 3, the Winston cone reflector 1 mounted in the upper jig 3 may be formed such that only a portion of the upper and lower parts of the cylindrical body contacts the upper and lower parts of the inner side of the upper jig 3 to prevent the deformation of the Winston cone reflector 1 by the cutting force of the tool and the vibration of the machine tool from being delivered to the cylindrical body as much as possible.

Figure 5:
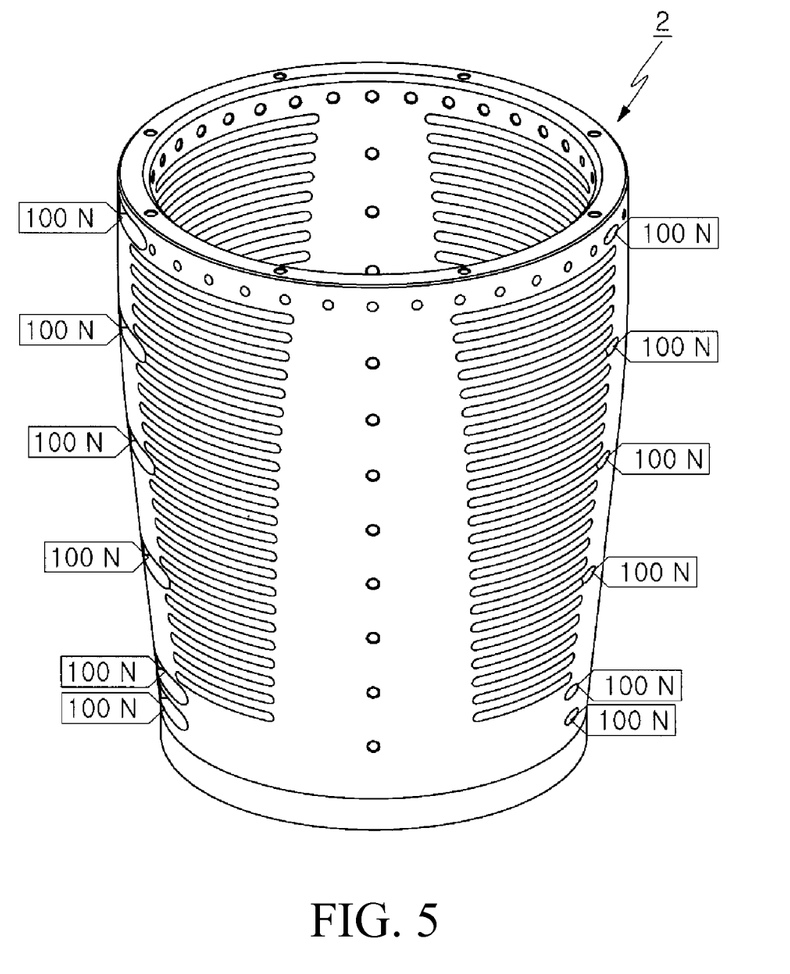
FIG. 5 is a view illustrating tensile force acting on coupling bolts for jigs upon cutting process of a Winston cone reflector.

The upper jig 3 may be formed to have a greater thickness at the lower part than that at the upper part to prevent the deformation of the jig and prevent the vibration from being delivered to the whole jig when the jig is coupled to a rotating chuck of the machine tool. In this case, as shown in FIG. 5, the thickness of the upper jig 3 may gradually increase toward the lower part thereof in consideration of the tensile force acting on the bolt coupling part where the left jig 5 and the right jig 6 are coupled to each other during the cutting process. The end portion of the lower part may have a thickness about two times greater than that of the upper part.

As shown in FIGS. 2 to 4, the lower jig 4 may include a circular protrusion plate 7 and a plurality of positioning pins 8. The circular protrusion plate 7 is disposed on the central part of the lower jig 4, and the outer diameter of the circular protrusion plate 7 contacts the inner diameter of the upper jig 3. The plurality of positioning pins 8 is disposed on the circular protrusion plate 7 at a predetermined interval to determine the location of the Winston cone reflector 1, the cutting subject.

The upper jig 3 comprises the left jig 5 and the right jig 6 that are coupled to each other by a plurality of bolts 9 and 11. In this case, the left jig 5 and the right jig 6 are coupled to the lower jig 4 by a plurality of bolts 10. In order to prevent the plurality of bolts 9 and 11 from being unfastened and broken during the cutting process and the high-speed rotation of the jig by the machine tool, four upper jig coupling bolts 9 are disposed in an upper portion of the upper jig at a predetermined uniform interval, and two upper jig coupling bolts 11 are disposed in a lower portion thereof at a smaller interval.

As shown in FIG. 5, the upper jig coupling bolts 9 and 11 may be made of a stainless steel so as to withstand a maximum tension of 100 N applied to each part during the cutting process. Also, a horizontal through hole 12 may be formed in the tangential surface at one side of the coupling part where the left jig and the right jig are coupled to each other such that the upper jig coupling bolts 9 and 11 can be horizontally coupled to nuts therein.

As shown in FIG. 2, the upper jig 3 may have a plurality of upper bolt holes 13 passing through the upper portions of the left and right jigs at a predetermined uniform internal to control the balance weight of the jig by inserting a plurality of small-size bolts into the upper bolt holes 13. Also, the left jig 5 and the right jig 6 may have a plurality of bolt holes 14 vertically formed in the central portion thereof at a predetermined uniform interval to control the balance weight.

As shown in FIGS. 2 to 5, the upper jig 3 may have a plurality of adhesive filling grooves 15 to support the outer surface of the Winston cone reflector 1, which is mounted for the inner surface processing, with an adhesive 16. The adhesive filling groove 15 may be vertically disposed from the upper part to the lower part of both left and right jigs 5 and 6 in two rows at a predetermined interval. The middle part of the Winston cone reflector 1 that does not contact the upper jig may be fixed by the adhesive 16 filled in the groove 15. Thus, the cylindrical body and the jig can be integrally rotated without delivering the rotational vibration of the machine tool to the Winston cone reflector 1 and deforming the Winston cone reflector by the cutting force of the tool.

Figure 6:
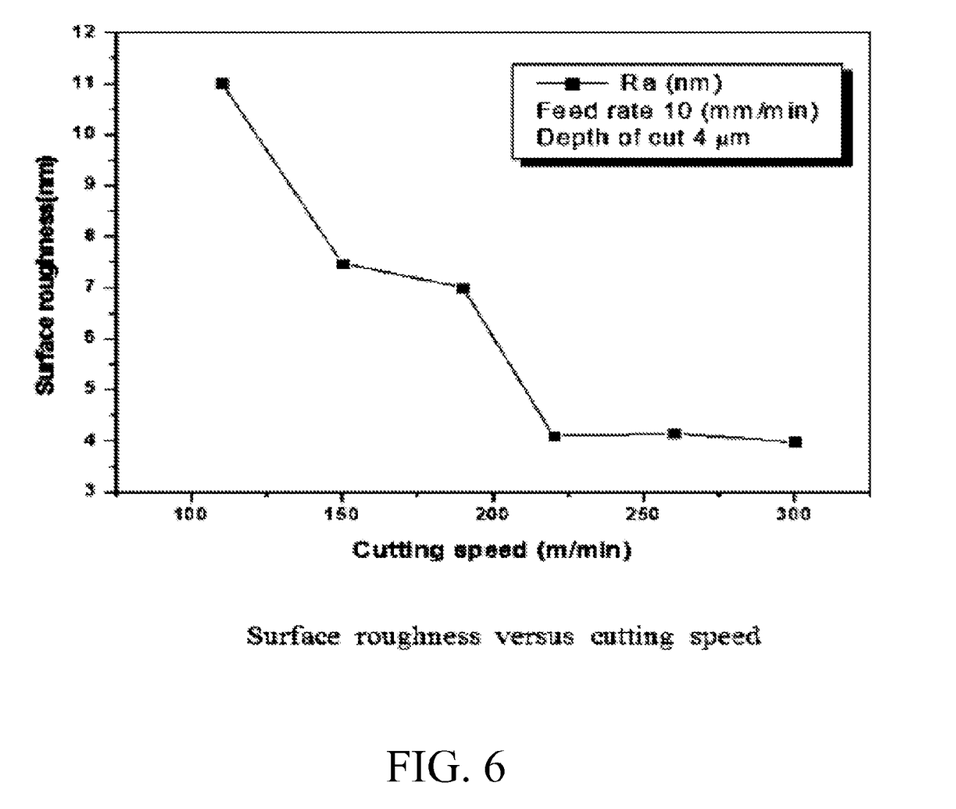
FIG. 6 is a graph illustrating a correlation between surface roughness of an aluminum alloy material and cutting speed.
Figure 7:
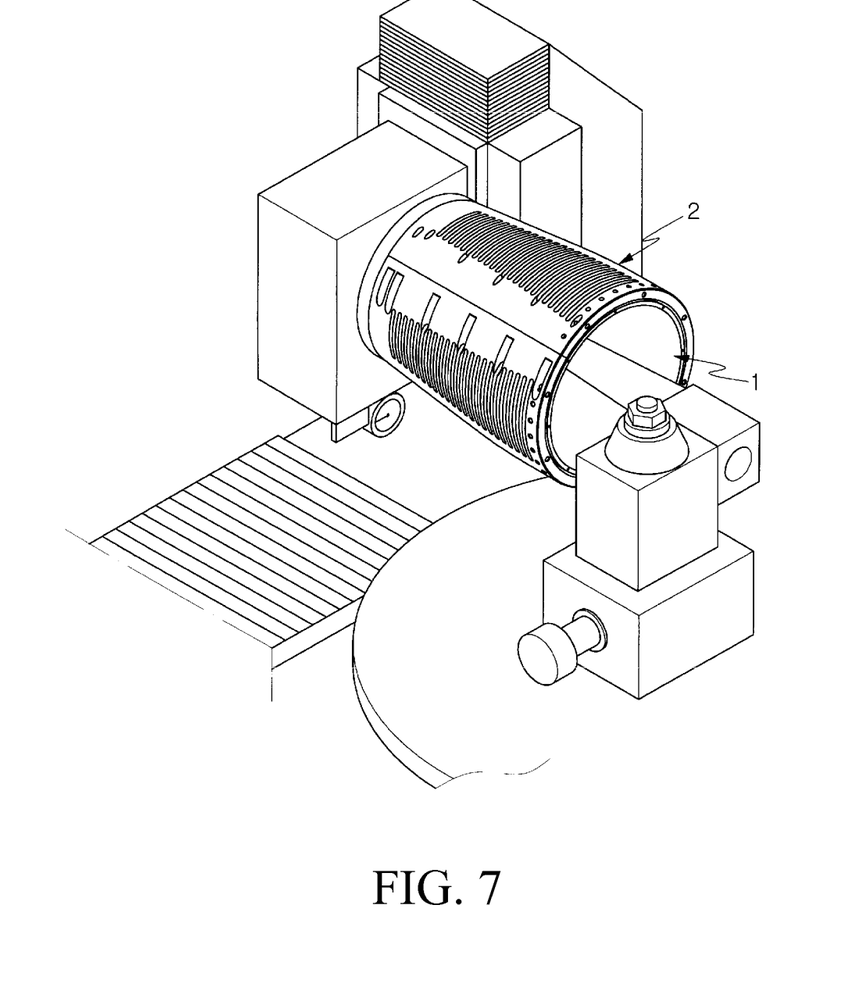
FIG. 7 is a view illustrating a high-precision cutting process on an inner surface of a Winston cone reflector using a jig according to an embodiment of the present invention.

As shown in FIG. 7, the cutting jig for the Winston cone reflector, having the above-mentioned structure, is provided. A high-precision cutting tool may be inserted into the inside of the Winston cone reflector for the cutting process. As shown in FIG. 6, the high-precision cutting may be performed at a transfer speed of about 10 mm/min, a cutting depth of about 4 micrometers, and a cutting speed of about 220 m/min to about 300 m/min. The inner surface of the reflector may be processed into a mirror-like surface having a surface roughness of about 4 nm. Particularly, when the transfer speed is about 1 mm/min, the surface roughness Ra becomes equal to or less than about 2.32 nm.

That is, due to the jig for processing the inner surface of the Winston cone reflector, the mirror-like surface can be achieved by low cost high-precision cutting process.

What is claimed is:

1. A cutting jig for a Winston cone reflector, the cutting jig comprising:
    an upper jig comprising a left jig and a right jig that are detachably coupled to each other by bolts and nuts, and are symmetrical in shape and size, the left jig and the right jig having a plurality of through holes circumferentially formed in an upper circumference thereof at a predetermined uniform interval and a plurality of through holes vertically formed in a central portion thereof at a predetermined uniform interval, respectively, the plurality of through holes for controlling a balance weight of the cutting jig; and
    a lower jig disposed under the upper jig, the Winston cone reflector having a thickness of a thin plate and made of an aluminum alloy,
    wherein the cutting jig receives and fixes the Winston cone reflector in a device for cutting an inner surface of the Winston cone reflector having a thickness of a thin plate and formed of an aluminum alloy.

2. The cutting jig of claim 1, wherein the lower jig is a circular plate structure on which the upper jig is seated, and comprises:
- a circular protrusion plate with an outer diameter contacting an inner diameter of the upper jig, the circular protrusion plate protruding at an central part of the lower jig; and
- a plurality of positioning pins disposed at a region near the outer diameter of the circular protrusion plate at a predetermined interval to determine a location of the Winston cone reflector mounted on the circular protrusion plate for a cutting process, and
- a plurality of bolt holes formed at a region near the outer diameter of the lower jig at a predetermined interval for coupling the lower jig to the upper jig.

3. The cutting jig of claim 2, wherein:
- the left jig and the right jig of the upper jig are coupled to each other by a plurality of bolts;
- the upper jig is coupled to the lower jig by bolts with the left jig and the right jig coupled to each other;
- four bolts are disposed on an upper part of the upper jig at a predetermined uniform interval and two bolts are disposed on a lower part of the upper jig at a smaller interval to prevent the bolts from being unfastened during the cutting process and a high speed rotation of the jig by a machine tool; and
- the bolts for coupling the upper jig and the lower jig are made of a stainless steel to withstand a maximum tension of 100 N.

4. The cutting jig of claim 3, wherein:
- the upper jig has a plurality of adhesive filling grooves to reduce a weight of the jig while supporting the Winston cone reflector which is mounted for processing of an inner surface thereof;
- the plurality of adhesive filling grooves is vertically disposed from the upper part to the lower part of both left and right jigs in two rows at a predetermined interval; and
- the plurality of adhesive filling grooves is filled with an adhesive to fix a middle part of a cylindrical body of the Winston cone reflector to the jig, thus allowing the cylindrical body and the jig to be integrally rotated without delivering a rotational vibration of the machine tool to the cylindrical body and without deforming the cylindrical body by a cutting force.

* * * * *